(12) United States Patent
Price et al.

(10) Patent No.: US 7,826,362 B2
(45) Date of Patent: Nov. 2, 2010

(54) UPSTREAM DATA RATE ESTIMATION

(75) Inventors: Jay Price, Lake Forest, CA (US); Allen J. Huotari, Garden Grove, CA (US); Manrique Brenes, Corona Del Mar, CA (US); Matthew B. McRae, Laguna Beach, CA (US)

(73) Assignee: Cisco Technology, Inc., San Jose, CA (US)

(*) Notice: Subject to any disclaimer, the term of this patent is extended or adjusted under 35 U.S.C. 154(b) by 963 days.

(21) Appl. No.: 11/093,894

(22) Filed: Mar. 30, 2005

(65) Prior Publication Data

US 2006/0221854 A1 Oct. 5, 2006

(51) Int. Cl.
*H04L 12/26* (2006.01)

(52) U.S. Cl. ............. 370/232; 370/235; 370/253

(58) Field of Classification Search ......... 370/229–235, 370/236.1–238.1, 241.1, 246–253; 709/223–229, 709/232–235
See application file for complete search history.

(56) References Cited

U.S. PATENT DOCUMENTS

| | | | |
|---|---|---|---|
| 6,297,823 B1 * | 10/2001 | Bharali et al. | 715/788 |
| 6,529,475 B1 * | 3/2003 | Wan et al. | 370/231 |
| 6,539,081 B2 * | 3/2003 | Zakrzewski et al. | 379/93.32 |
| 6,757,255 B1 * | 6/2004 | Aoki et al. | 370/252 |
| 6,760,596 B1 * | 7/2004 | Fiorini et al. | 455/522 |
| 6,798,751 B1 * | 9/2004 | Voit et al. | 370/252 |
| 6,859,186 B2 | 2/2005 | Lizalek et al. | |
| 7,181,503 B2 * | 2/2007 | Choi et al. | 709/218 |
| 7,272,111 B2 * | 9/2007 | Zukerman et al. | 370/230 |
| 7,289,489 B1 * | 10/2007 | Kung et al. | 370/352 |
| 2001/0004356 A1 * | 6/2001 | Faber | 370/335 |
| 2002/0013725 A1 * | 1/2002 | Takakura et al. | 705/10 |
| 2002/0064129 A1 * | 5/2002 | Serbest et al. | 370/230 |
| 2002/0133614 A1 * | 9/2002 | Weerahandi et al. | 709/237 |
| 2003/0026241 A1 * | 2/2003 | Ono et al. | 370/349 |
| 2003/0086422 A1 * | 5/2003 | Klinker et al. | 370/389 |
| 2004/0136359 A1 * | 7/2004 | Ivancovsky et al. | 370/352 |
| 2004/0179480 A1 * | 9/2004 | Attar et al. | 370/252 |
| 2005/0018611 A1 * | 1/2005 | Chan et al. | 370/241 |
| 2005/0169254 A1 * | 8/2005 | Kurita et al. | 370/352 |
| 2005/0232227 A1 * | 10/2005 | Jorgenson et al. | 370/351 |
| 2005/0265321 A1 * | 12/2005 | Rappaport et al. | 370/352 |
| 2006/0002425 A1 * | 1/2006 | Mane et al. | 370/477 |
| 2006/0155981 A1 * | 7/2006 | Mizutani et al. | 713/150 |
| 2006/0190594 A1 * | 8/2006 | Jorgenson et al. | 709/224 |
| 2006/0227717 A1 * | 10/2006 | van den Berg et al. | 370/252 |
| 2008/0170500 A1 * | 7/2008 | Ito et al. | 370/235 |

OTHER PUBLICATIONS

Chang et al., Upstream Bandwidth Estimation, U.S. Appl. No. 10/965,593, filed Oct. 13, 2004.

* cited by examiner

*Primary Examiner*—Thai D Hoang
(74) *Attorney, Agent, or Firm*—Haynes & Boone, LLP.

(57) ABSTRACT

In one embodiment, a VoIP-integrated router operable to interface with analog telephones and digital devices is provided. The VoIP-integrated router is configured to perform a method of estimating the upstream data rate of a modem, comprising transmitting packets at a known rate from the VoIP-integrated router through an upstream path for the modem to a node; during the transmission of the packets, transmitting Internet Control Message Protocol (ICMP) PING messages to the node; and based upon an examination of the PING messages and the known rate, estimating the upstream data rate of the modem.

21 Claims, 6 Drawing Sheets

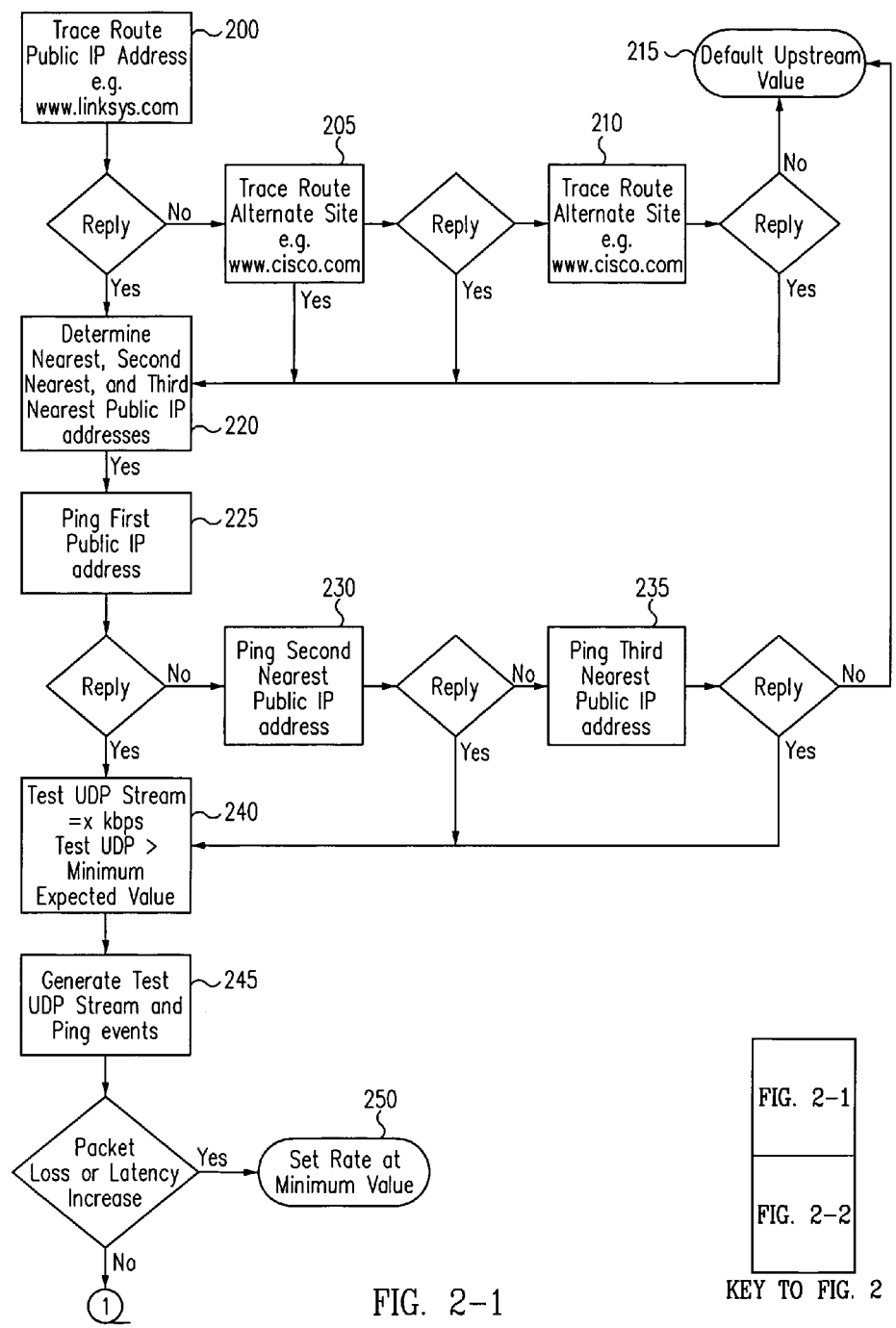
FIG. 2-1
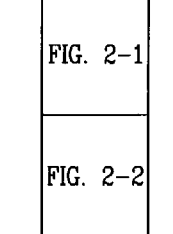
KEY TO FIG. 2

UPSTREAM DATA RATE ESTIMATION

TECHNICAL FIELD

This invention relates generally to networks, and more particularly to the estimation of the upstream data rate for users in a broadband network.

BACKGROUND

Voice over IP (VoIP) has the capability of substantially lowering costs with respect to traditional telephone service. Rather than use conventional analog telephone lines, a user having a VoIP-enabled telephone connects with other callers through the digital lines supported by the Internet. Because the connection is digital, a VoIP-enabled phone offers features and services that a conventional telephone typically cannot, such as sending images or videos in conjunction with voice communication. Moreover, as is the case with conventional Web-browsing, VoIP calls have the potential for the same toll, regardless of the length of the conversation and the distance called.

Although VoIP telephony has great potential, it also faces considerable technical challenges. In traditional telephony, a call is placed over a dedicated circuit. The traditional telephone network provides resources that guarantee the voice quality over this dedicated circuit set up to support the telephone call. In contrast, communication over the Internet is packet-based. Each packet has two parts: an information payload and meta-data such as the destination address. On the Internet, packets are forwarded by routers based upon the destination address. Each packet making up digital content could thus be sent from a source to a destination address over independent paths with arbitrary delays- there is no dedicated circuit as is the case for traditional telephony. The absence of a dedicated circuit does not impact traditional Web-browsing, however. A user wishing to download a webpage can wait until the various packets making up the webpage's content are routed through the Internet and then re-assembled to present the desired content.

But effective voice communication cannot occur with arbitrary delays on the digitized voice messages. Instead, effective voice communication can tolerate a maximum of approximately 100 to 150 milliseconds of delay between the time speech is uttered and the time it is heard by the listener. Greater delays hinder communication and violate the users' real-time expectations. But packets themselves hinder real-time communication. For example, suppose a VoIP protocol uses 500-byte packets. Assuming that voice is digitized at 8000 one-byte samples per second, each 500-byte packet would take 62.5 milliseconds to fill. Over 60% of the entire acceptable delay may thus be taken up by just filling the packet, which hasn't yet touched the Internet. To combat this problem, specialized voice compression and VoIP protocols have been developed such as H.323.

As the use of VoIP telephony expands into the home market, it must combat the restricted data rates typically available to a home-based Internet user. For example, consider the two most-commonly-used high-speed Internet access methods available for the home user: Digital Subscriber Line (DSL) and cable modem services. For both services, the available data rates and corresponding bandwidths are typically asymmetrically proportioned such that a user has a greater downstream data rate than an upstream data rate. This asymmetric division satisfies a typical Web-browser's needs in that content generally flows downstream from webpages to a user's web-browser rather than in the upstream direction. Depending upon the subscription purchased, a DSL provider will offer varying data rate packages to its users. For example, a DSL provider may offer a standard package providing a downstream data rate of 512 kbps and an upstream data rate of 128 kbps. In contrast to the conventional package just described, "premium" packages would offer greater downstream and upstream data rates, albeit in analogous asymmetric proportions. The upstream data rate for a cable modem service is more nebulous in that cable modem services do not offer the fixed data rates that DSL services can offer. Instead, the available data rate for a cable modem is affected by the use of the cable by others and will thus vary depending upon cable traffic. However, cable modems typically proportion the available data rate for any given user in an asymmetric fashion between upstream and downstream uses. Thus, typical upstream cable modem data rates will also often be in the range of 128 kbps.

As discussed above, the acceptable delay for VoIP telephony is approximately 100 to 150 milliseconds. The limited upstream data rate typically provided by high-speed Internet access methods such as DSL and cable modems is a factor in this delay. If too little upstream data rate is available, the voice data rate is slowed such that the acceptable delay limit will be violated. For example, VoIP implemented with a G.711 codec may require up to 100 kbps in upstream data rate. But note that a VoIP caller may also be emailing others while speaking. In particular, recall that VoIP also supports the sending of digital content such as video in addition to the voice communication. Thus, a VoIP call may also compete for the limited upstream data rate with the presence of other digital content being transmitted upstream. In addition, the VoIP caller may be sharing a modem with other users on a LAN who happen to be uploading content. Depending upon the available upstream data rate, the data rate of content besides voice data may need to be limited to provide adequate VoIP telephony service.

Accordingly, there is a need in the art for improved VoIP systems that can estimate their available upstream data rate and adjust the upstream voice and non-voice data loads accordingly.

Embodiments of the present invention and their advantages are best understood by referring to the detailed description

DETAILED DESCRIPTION

Figure 1:
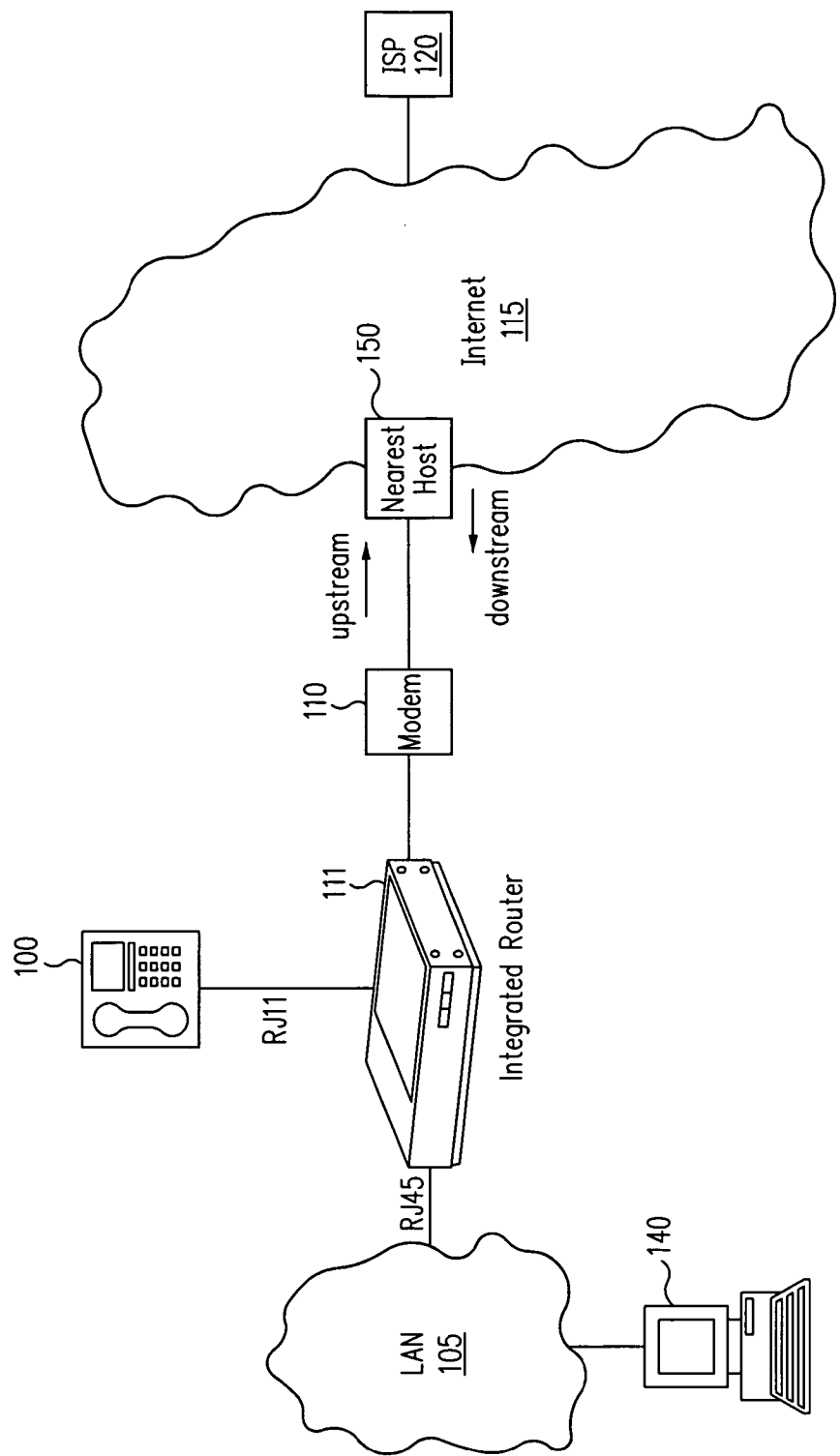
FIG. 1 is a block diagram illustrating a system including an VoIP-integrated router that estimates an upstream data rate of a modem in accordance with an embodiment of the invention.

Turning now to FIG. 1, an exemplary embodiment of the present invention is illustrated. A modem 110 allows users on a LAN 105 to access content on Internet 115 through communication with a VoIP Internet Service Provider (ISP) server 120. Modem 110 can be any suitable modem such as a DSL modem or a cable modem. As discussed previously, modem 110 has a limited upstream data rate supporting the transmission of digital content to ISP server 120. Typically, this limited upstream data rate would be less than the downstream data rate over which modem 110 may receive content from ISP server 120. However, it will be appreciated that the present invention may be used to estimate the upstream data rate for modem 110 regardless of the relationship between the upstream and downstream data rates.

An integrated router 111 provides the interface between users on LAN 105 and nodes on Internet 115. Integrated router 111 may also be denoted as a residential gateway. The upstream data rate estimation disclosed herein is described with respect to an "initiator." For the embodiment illustrated in FIG. 1, it is convenient to use integrated router 111 as the initiator. However, it will be appreciated that the initiator may comprise other devices. Router 111 is an integrated router in that it supports voice over IP (VoIP) calls as well. Thus, integrated router 111 includes an analog port such as an RJ11 port over which it may communicate with a conventional analog telephone 100. Integrated router 111 includes other ports such an Ethernet RJ45 port over which it communicates with devices on LAN 105 such as a processor 140. These devices on LAN 105 generate IP data packets that integrated router 111 transmits through modem 110 to upstream destinations on Internet 115. In addition, integrated router 111 transmits VoIP packets to upstream destinations on Internet 115 based upon the telephone number dialed on telephone 100. As discussed previously, to satisfy quality of service (QoS) expectations for voice communications, VoIP requires a certain upstream data rate capability for modem 110—for example, VoIP implemented with a G.711 codec may require up to 100 kbps in upstream data rate. To measure the upstream data rate for modem 110 so that data traffic may be limited accordingly, integrated router 111 initiates the measurement by transmitting IP packets through modem 110 and the upstream data rate to a node on Internet 115.

To provide a more accurate estimate, initiator/integrated router 111 may initiate an Internet Control Message Protocol (ICMP) TraceRoute message to a primary IP address or host name on Internet 115. As known in the ICMP arts, a TraceRoute message allows a user to trace the route between two computers from source to destination. As a message propagates through the Internet, it "hops" from router to router. Such hops may occur many times before a message reaches its destination. A TraceRoute message provides a results record for each hop of: a) the host name, b) the IP address corresponding to the host name, and c) the response time for each host name in the routing path that is traversed.

Integrated router 111 may thus use a TraceRoute message to determine a "nearest" host 150 with a public IP address on Internet 115. It is the path from the initiator such as integrated router 111 to nearest host 150 that is most likely to give an accurate determination of the upstream data rate for modem 110. As additional hops become involved, these hops will obfuscate the upstream data rate estimation. However, embodiments of the present invention may eliminate this interference through the identification of nearest host 150 and using its IP address to conduct the estimation.

Having identified the IP address for nearest host 150, initiator/integrated router 111 may proceed to transmit a sequence of User Datagram Protocol (UDP) packets to this target IP address. The packet size may be initiated at some suitable size such as 1000-1250 bytes. However, it will be appreciated that the packet size is arbitrary. The initiator begins by transmitting the packets at a suitably low rate that will be supported by the upstream data rate for modem 110. This rate is then increased until the upstream can no longer reliably transmit the packets. In this fashion, the upstream data rate may be "titrated" by the increasing rate of packet transmission.

To determine the point at which packets are being lost, a regular series of ICMP PING messages may be transmitted to the target IP address while the UDP packets are also transmitted. By examining the latency and packet loss of the PING messages, the upstream data rate may be accurately determined. Having determined excessive latency and/or packet loss in the PING message stream, the initiator may then decrease the UDP packet rate until the excessive latency/packet loss is diminished. The UDP packet rate may then be increased to perform additional measurement iterations for increased accuracy. As an alternative to the use of UDP packets as just described, the initiator could generate actual streams of data akin to those used an application such as VoIP. Having determined the upstream data rate, the initiator may then limit non-VoIP data traffic accordingly to assure a suitable QoS for VoIP calls.

Figure 2:
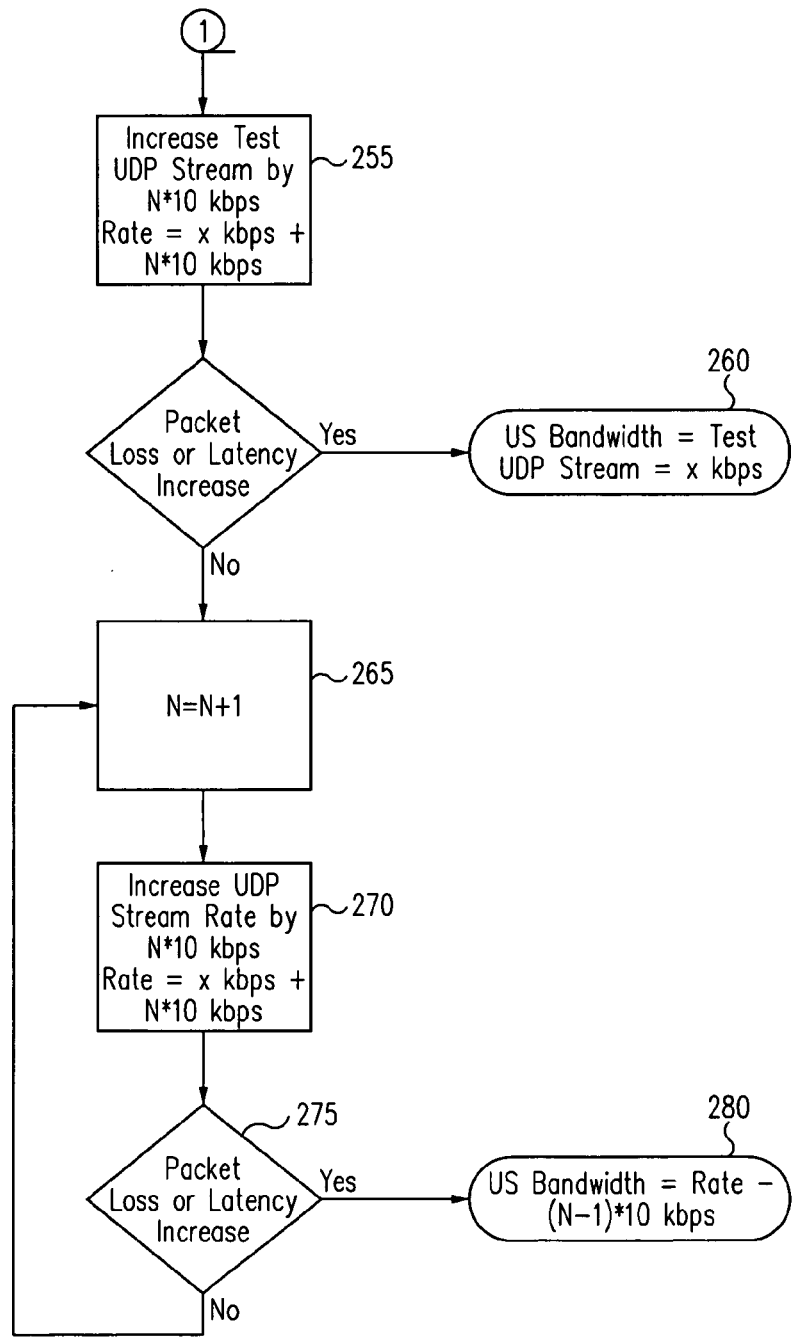
FIG. 2 is a flowchart illustrating a modem upstream data rate estimation method in accordance with an embodiment of the invention.

The upstream data rate estimation process performed by the initiator may be summarized with respect to the flowchart shown in FIG. 2. At an initial step 200, the initiator sends a TraceRoute message to a known public IP address. If there is no reply, the initiator may send a TraceRoute message to an alternative IP address at step 205. If there is still no reply, the initiator may send a TraceRoute message to yet another alternative IP address at step 210. Finally, if there is no reply to the TraceRoute from step 210, a default upstream data rate may be assumed in step 215.

However, if there is a reply to any of the TraceRoute messages, the nearest, second-nearest, and third-nearest public IP addresses may be determined in step 220. The suitability of the nearest IP address may be tested by a PING message in step 225. If there is no reply, the second-nearest IP address may be PINGed in step 230. If there is still no reply, the third-nearest IP address may be PINGed in step 235. Should no reply be received, the default upstream data rate value may be assumed in step 215.

However, if a reply from any of the PING messages is received, the UDP packet stream may be initiated at step 240 using a relatively low transmission rate believed to within the upstream data rate limitations. This rate may be denoted as x kbps. Concurrent PING messages are also transmitted in step 240. If a threshold value of latency and/or packet loss is determined in the PING messages, the upstream data rate estimate is set according to the x kbps rate in step 250. Should no threshold value be detected, the UDP packet transmission rate may be increased in step 255. For example, the rate may be increased according to an integer multiple N of 10 kbps. If a threshold value of latency and/or packet loss is determined in the PING messages, the upstream data rate estimate is set according to this increased transmission rate in step 260. If no threshold value is detected, N may be increased at a step 265, the UDP rate increased accordingly in step 270. The threshold examination of packet loss and/or latency occurs in step 275 such that steps 265 and 270 are repeated if the threshold is not reached. When the threshold packet loss and/or latency occurs, the upstream data rate estimate is set accordingly at step 280.

Note the advantages of such an upstream data rate estimation technique. A typical user of modem 110 will not be aware of the upstream data rate available for modem 110 nor will have the technical expertise to ascertain this upstream data rate from user manuals or the like. However, as discussed previously, a certain portion of the upstream data rate must be reserved for VoIP data traffic to satisfy the expected QoS for adequate telephone service. The user then has no intelligent way to modify or configure integrated router 111 to limit other upstream data traffic to provide the desired VoIP QoS because the limitation on the other upstream data traffic will depend upon the available upstream data rate. But an integrated router 111 configured to implement the data rate estimation techniques disclosed herein eliminates the need for a sophisticated user to ascertain the upstream data rate. Moreover, no matter how sophisticated a user may be, should modem 110 be a cable modem, the upstream data rate can only be ascertained in a dynamic fashion—a cable modem user cannot be guaranteed any fixed data rate as may be the case for a DSL modem.

Figure 3:
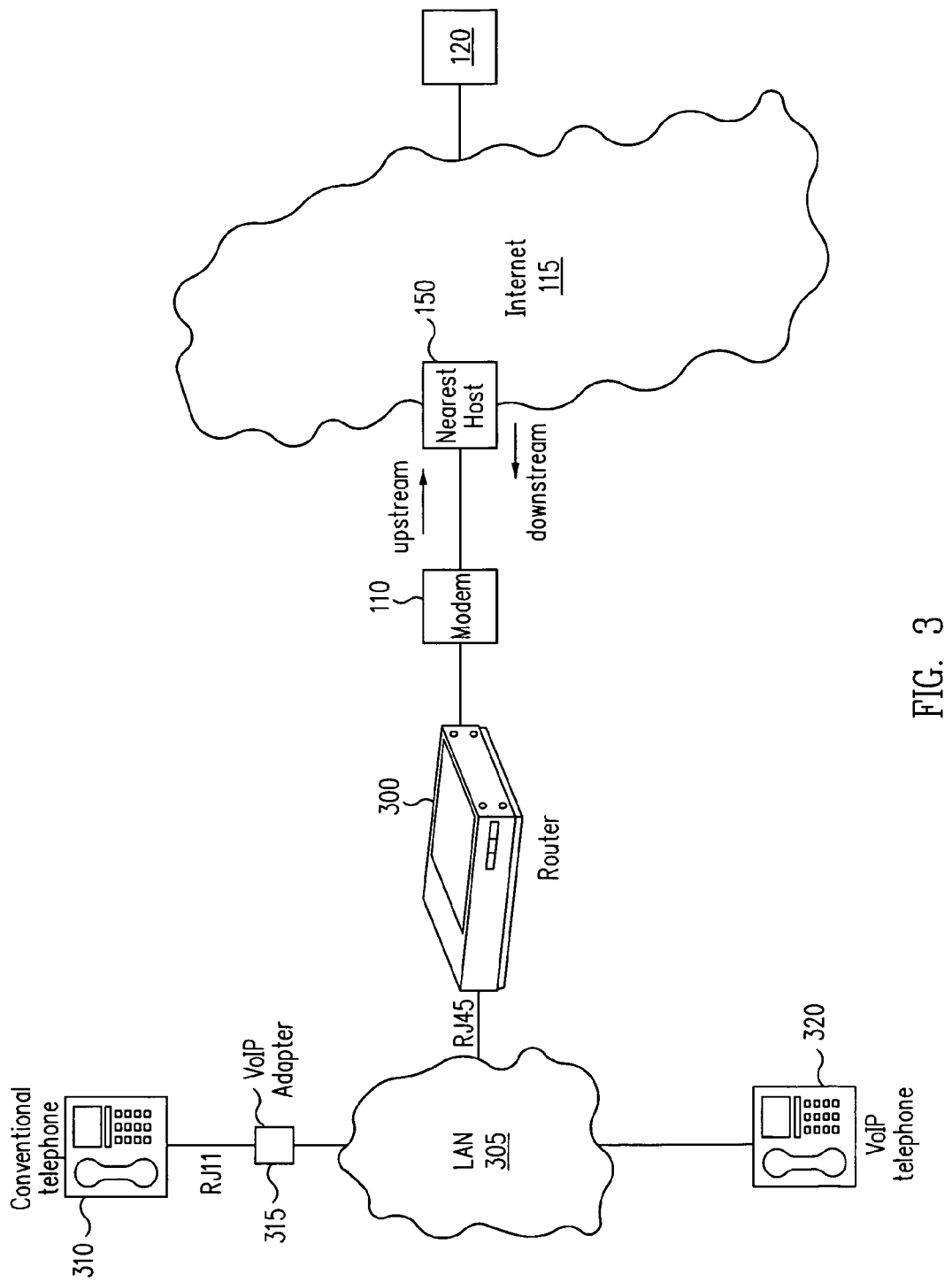
FIG. 3 is a block diagram illustrating a system including a non-VoIP-integrated router, wherein the system estimates a modem upstream data rate in accordance with an embodiment of the invention.

Those of ordinary skill in the art will appreciate that many modifications may be made to the embodiments described herein. For example, rather than implement the data rate estimation algorithm directly through integrated router 111, an external device such as processor 140 may command router 111 to transmit the PING and UDP packets. Processor 140 would then process the resulting delay differences between the PING packets and configure integrated router 111 accordingly to limit the non-VoIP packets so as to preserve a QoS-satisfactory upstream data rate for the VoIP packets. Moreover, the upstream data rate technique may be implemented into networks that do not incorporate an integrated router. For example, a non-VoIP-enabled router 300 may be used to connect a LAN 305 to Internet 115 as shown in FIG. 3. A user on LAN 305 may place VoIP calls using a conventional analog telephone 310 through the use of a VoIP adapter 315 as known in the art. VoIP adapter 315 converts analog signals from conventional telephone 310 into VoIP packets that are then transmitted onto LAN 305. Router 300 then routes the VoIP packets to a VoIP ISP 120 as limited by the upstream data rate of modem 110. Analogously as discussed with respect to FIG. 1, router 300 itself may initiate the transmission of PING messages and UDP packets to nearest host 150 or it may be commanded to do so by a processor coupled to LAN 305 so that the upstream data rate for modem 110 may be estimated. However, because router 300 is not a VoIP-integrated router, router 300 has no way of knowing whether or not the packets it routes are VoIP packets. Thus, router 300 cannot directly regulate the transmission of non-VoIP data packets to reserve a QoS-acceptable upstream data rate portion for VoIP packet traffic. To allow an indirect regulation, all other nodes on LAN 305 that provide non-VoIP data packets to router 300 may be configured to assign a certain maximum priority to their packet transmissions. The VoIP sources such as VoIP adapter 315 and VoIP telephone 320 may be configured to assign a priority to their packet transmissions that is higher than the maximum priority assigned to all other data packet transmissions. Router 300 would then examine the priority designation for all data packets it receives. Those packets with a priority designation higher than the maximum priority given to data packet transmissions would be assumed to be VoIP packets. Router 300 reserves a QoS-acceptable upstream transmission data rate for the assumed-to-be VoIP packets just as integrated router 111 would reserve such a data rate for its confirmed-VoIP packets.

Figure 4:
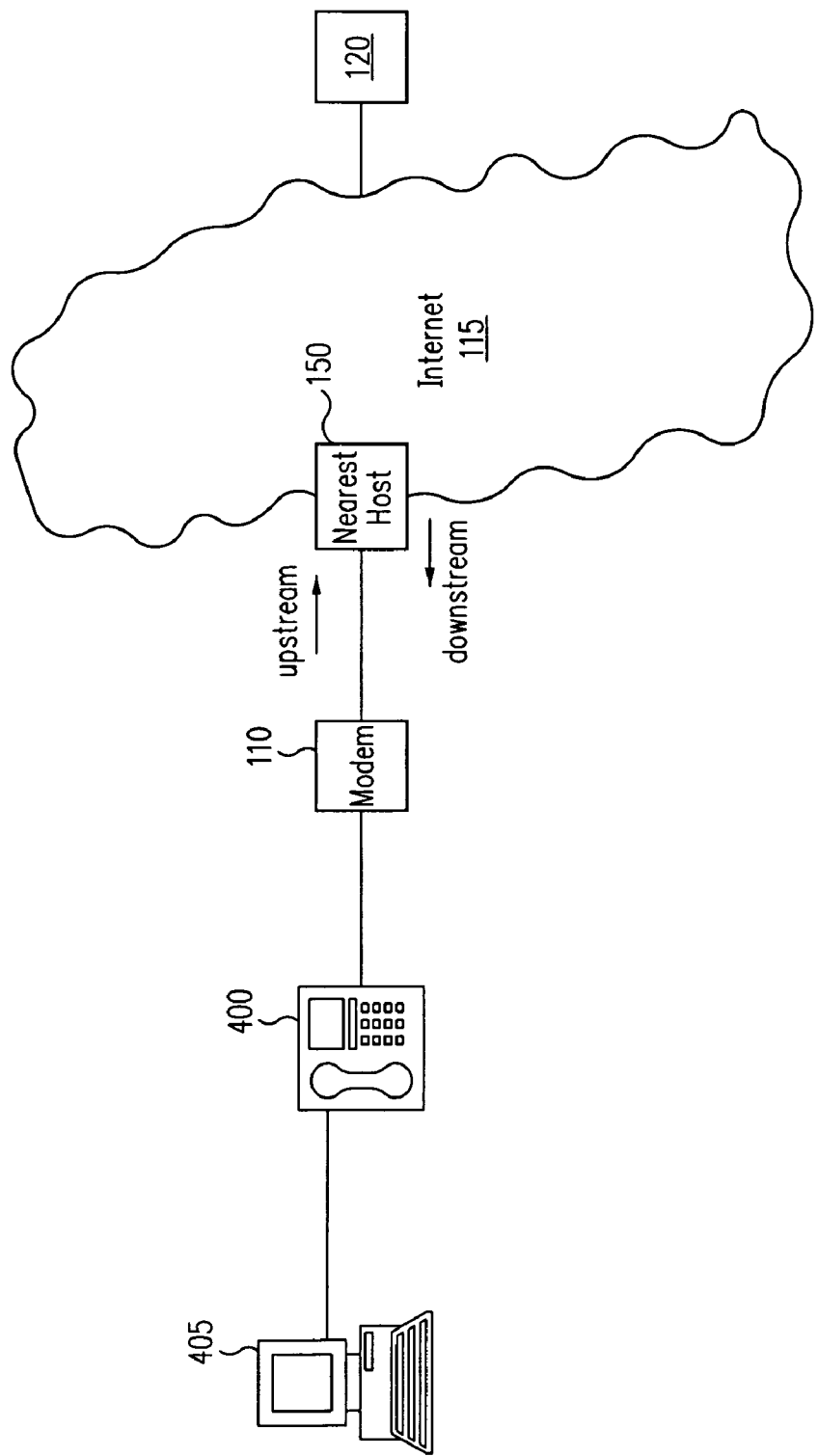
FIG. 4 is a block diagram illustrating a system including a VoIP telephone that is configured to estimate a modem upstream data rate in accordance with an embodiment of the invention.

In an alternate embodiment, the upstream data rate estimation technique described herein may be performed by a VoIP telephone 400 that directly couples to a modem such as seen in FIG. 4. VoIP telephone 400 may also route data traffic such as from processor 405 as limited by the upstream data rate of modem 110. Thus, VoIP telephone 400 would be configured to transmit a series of PING messaged and UDP packets to neighbor host 150. These messages may then be processed as discussed herein to calculate the modem upstream data rate. Based upon this estimation, VoIP telephone 400 would limit the transmission of non-VoIP data packets accordingly.

Figure 5:
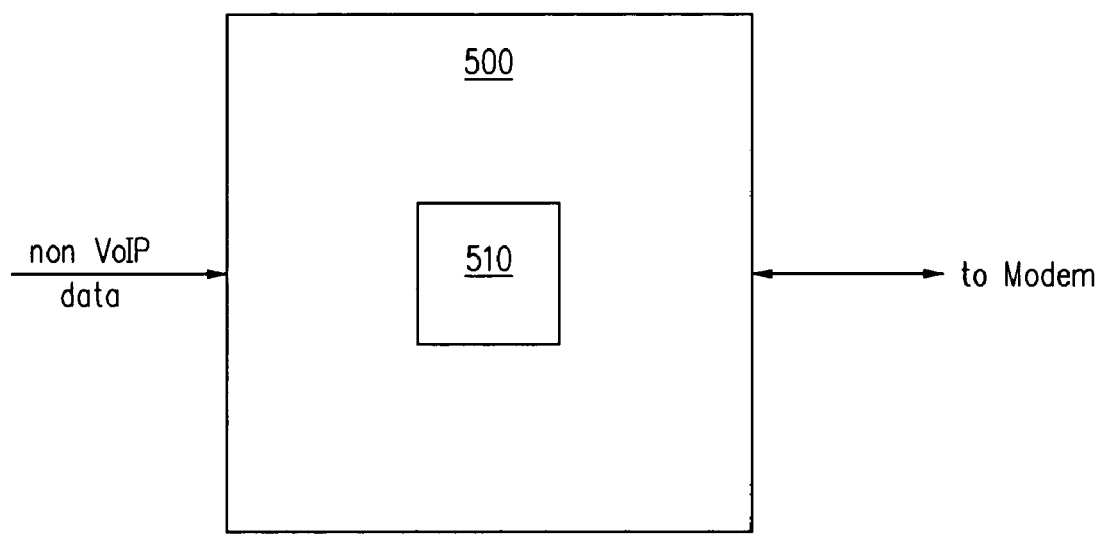
FIG. 5 is a block diagram of a network device configured to estimate the upstream data rate of another network device in accordance with an embodiment of the invention.

Although the preceding discussion has discussed the upstream data rate estimation technique with respect to routers and VoIP telephones, it will be appreciated that this technique may be implemented in any suitable network device. For example, a generic network device 500 architecture is shown in FIG. 5. Network device 500 includes a logic engine 510 configured to perform the upstream data rate procedure of the present invention. Logic engine 510 may be implemented with dedicated hardware, firmware, or with a general purpose microprocessor. Logic engine 510 estimates the upstream data rate for another network device (not illustrated). Having estimated the upstream data rate, logic engine 510 may limit the transmission of non-VoIP data traffic accordingly through the upstream path for the other network device.

Those of ordinary skill will appreciate that other data payloads besides UDP packets may be used to test the upstream data rate. In addition, the node receiving the data payloads need not be a nearest neighbor. Thus, although the invention has been described with respect to particular embodiments, this description is only an example of the invention's application and should not be taken as a limitation. Consequently, the scope of the invention is set forth in the following claims.

We claim:

1. A device configured to estimate the upstream data rate of a network device, comprising:
   a transceiver operable to transmit packets to and receive packets from the network device; and
   a logic engine configured to transmit a TraceRoute message to determine a nearest host with a public IP address on the Internet, the logic engine being further configured to transmit first packets at a known data rate through an upstream path for the network device to the nearest host, the logic engine being further configured to, concurrent with the transmission of the first packets, transmit second packets to the nearest host, wherein each of the second packets is configured such that the nearest host returns a reply packet through a downstream path for the network device in response to the receipt of the second packet and wherein the first packets are User Datagram Protocol (UDP) packets, the logic engine being further configured to increase the known data rate until a latency and/or a loss of the reply packets exceeds an acceptable level, the logic engine thereby determining a threshold data rate for the first packets at which the latency and/or loss of the reply packets exceeds the acceptable level and to estimate the upstream data rate for the network device based upon the threshold data rate.

2. The device of claim 1, wherein the logic engine is further configured to limit non-VoIP data traffic on the upstream path for the network device based upon the upstream data rate estimation.

3. The device of claim 2, wherein the logic engine is further configured to limit non-VoIP data traffic based upon a desired quality of service for VoIP telephone calls.

4. A VoIP-integrated router operable to interface with analog telephones and digital devices, comprising:
 a transceiver operable to transmit packets to and receive packets from a network device; and
 a logic engine configured to estimate an upstream data rate for the network device by performing the acts of:
 determining a nearest host on the Internet having a public IP address;
 transmitting first packets at a known data rate through an upstream path for the network device to the nearest host;
 concurrent with the transmission of the first packets, transmitting second packets to the nearest host, wherein each of the second packets is configured such that the nearest host returns a reply packet through a downstream path for the network device to the VoIP-integrated router in response to the receipt of the second packet and wherein the first packets are User Datagram Protocol (UDP) packets;
 increasing the known data rate until a latency and/or a loss of the reply packets exceeds an acceptable level, the logic engine thereby determining a threshold data rate for the first packets at which the latency and/or loss of the reply packets exceeds the acceptable level; and
 estimating the upstream data rate of the network device based upon the threshold data rate.

5. The VoIP-integrated router of claim 4, wherein the VoIP-integrated router is configured such that the second packets are Internet Control Message Protocol (ICMP) PING packets, the reply packets thereby being ICMP reply packets.

6. The VoIP-integrated router of claim 5, wherein the VoIP-integrated router is configured to determine a roundtrip time from each ICMP reply packet and to use the roundtrip times in the estimation of the upstream data rate.

7. The VoIP-integrated router of claim 4, wherein the network device is a modem and wherein the VoIP-integrated router is configured to also limit non-VoIP data traffic on the upstream path for the modem based upon the upstream data rate estimation.

8. The VoIP-integrated router of claim 7, wherein the limitation of the non-VoIP data traffic is also based upon a desired quality of service (QoS) for VoIP data traffic.

9. The VoIP-integrated router of claim 4, wherein the VoIP-integrated router is configured to identify the nearest host by:
 transmitting a TraceRoute message;
 and examining a reply from the TraceRoute message to identify the nearest host.

10. The VoIP-integrated router of claim 4, wherein the VoIP-integrated router is configured to vary the known data rate.

11. A router operable to examine the priority of data packets before routing the data packets, wherein a first class of data packets being routed are assigned a priority that is greater than a maximum priority given to a second class of data packets being routed, and wherein the router is configured to estimate the upstream data rate of a modem by performing the acts of:
 determining a nearest host on the Internet having a public IP address;
 transmitting first packets at a known data rate through an upstream path for the modem to the nearest host;
 concurrent with the transmission of the first packets, transmitting second packets to the nearest host, wherein each of the second packets is configured such that the nearest host returns a reply packet through a downstream path for the modem to the VoIP-integrated router in response to the receipt of the second packet and wherein the first packets are User Datagram Protocol (UDP) packets;
 increasing the known data rate until a latency and/or a loss of the reply packets exceeds an acceptable level, the logic engine thereby determining a threshold data rate for the first packets at which the latency and/or loss of the reply packets exceeds the acceptable level;
 estimating the upstream data rate of the modem based upon the threshold data rate; and
 limiting transmission of the second class of data packets through the upstream path for the modem based upon the upstream data rate estimation.

12. The router of claim 11, wherein the router is configured such that the second packets are Internet Control Message Protocol (ICMP) PING packets, the reply packets thereby being ICMP reply packets.

13. The router of claim 12, wherein the router is configured to determine the nearest host by:
 transmitting a TraceRoute message; and
 examining a reply from the TraceRoute message.

14. The router of claim 12, wherein the router is configured to vary the known data rate.

15. A VoIP telephone, wherein the VoIP telephone is configured to estimate the upstream data rate of a network device by performing the acts of:
 identifying a nearest host on the Internet having a public IP address;
 transmitting first packets at a known data rate through an upstream path for the network device to the nearest host;
 concurrent with the transmission of the first packets, transmitting second packets to the nearest host, wherein each of the second packets is configured such that the nearest host returns a reply packet through a downstream path for the network device to the VoIP-integrated router in response to the receipt of the second packet and wherein the first packets are User Datagram Protocol (UDP) packets;
 increasing the known data rate until a latency and/or a loss of the reply packets exceeds an acceptable level, the logic engine thereby determining a threshold data rate for the first packets at which the latency and/or loss of the reply packets exceeds the acceptable level; and
 estimating the upstream data rate of the network device based upon the threshold data rate.

16. The VoIP telephone of claim 15, wherein the VoIP telephone is configured to also limit non-VoIP data traffic on the upstream path for the network device based upon the upstream data rate estimation.

17. The VoIP telephone of claim 16, wherein the limitation of the non-VoIP data traffic is also based upon a desired quality of service (QoS) for VoIP data traffic.

18. A method of estimating the upstream data rate of a network device, comprising:
 identifying a nearest host on the Internet having a public IP address;
 transmitting first packets at a known data rate through an upstream path for the network device to the nearest host;
 concurrent with the transmission of the first packets, transmitting second packets to the nearest host, wherein each of the second packets is configured such that the nearest host returns a reply packet through a downstream path in response to the receipt of the second packet and wherein the first packets are User Datagram Protocol (UDP) packets;
 increasing the known data rate until a latency and/or a loss of the reply packets exceeds an acceptable level, the logic engine thereby determining a threshold data rate for the first packets at which the latency and/or loss of the reply packets exceeds the acceptable level; and estimating the upstream data rate of the network device based upon the threshold data rate.

19. The method of claim 18, wherein the transmission of the first packets comprises transmitting the first packets at known data rate that is continually increased.

20. The method of claim 19, wherein the second packets are Internet Control Message Protocol (ICMP) PING packets, the reply packets thereby being ICMP reply packets.

21. The method of claim 20, wherein identifying the nearest host comprises:

transmitting a TraceRoute message; and examining a reply from the TraceRoute message.

* * * * *